United States Patent
Arai

(10) Patent No.: US 8,022,926 B2
(45) Date of Patent: Sep. 20, 2011

(54) RADIO COMMUNICATIONS TERMINAL APPARATUS

(75) Inventor: Masae Arai, Hachioji (JP)

(73) Assignee: Fujitsu Toshiba Mobile Communications Limited, Kawasaki (JP)

(*) Notice: Subject to any disclaimer, the term of this patent is extended or adjusted under 35 U.S.C. 154(b) by 1293 days.

(21) Appl. No.: 11/497,730

(22) Filed: Aug. 2, 2006

(65) Prior Publication Data
US 2007/0264966 A1 Nov. 15, 2007

(30) Foreign Application Priority Data
Apr. 13, 2006 (JP) ................. 2006-111200

(51) Int. Cl.
*G09G 5/00* (2006.01)
*H04M 11/00* (2006.01)

(52) U.S. Cl. ......... 345/156; 345/169; 345/684; 455/403

(58) Field of Classification Search .......... 345/156–169, 345/684–688; 455/410, 411, 412, 1, 2, 403, 455/412.1, 412.2; 715/784–800
See application file for complete search history.

(56) References Cited

U.S. PATENT DOCUMENTS
| | | | | |
|---|---|---|---|---|
| 5,959,544 A * | 9/1999 | Matsuura | ............. | 340/7.53 |
| 6,288,701 B1 * | 9/2001 | Karp | ............. | 345/685 |
| 6,509,907 B1 * | 1/2003 | Kuwabara | ............. | 345/684 |
| 7,460,108 B2 * | 12/2008 | Tamura | ............. | 345/169 |
| 2002/0027565 A1 * | 3/2002 | Syukri | ............. | 345/684 |
| 2004/0080541 A1 * | 4/2004 | Saiga et al. | ............. | 345/805 |
| 2006/0050177 A1 * | 3/2006 | Ikeguchi et al. | ............. | 348/553 |
| 2006/0084416 A1 * | 4/2006 | Wakasa et al. | ............. | 455/414.2 |
| 2006/0174214 A1 * | 8/2006 | McKee et al. | ............. | 715/802 |
| 2006/0212905 A1 * | 9/2006 | Matsuda et al. | ............. | 725/51 |
| 2006/0224716 A1 * | 10/2006 | Nakazawa et al. | ............. | 709/223 |
| 2007/0265031 A1 * | 11/2007 | Koizumi et al. | ............. | 455/556.1 |

FOREIGN PATENT DOCUMENTS
| | | |
|---|---|---|
| JP | 10-269154 A | 10/1998 |
| JP | 2002-259015 A | 9/2002 |
| JP | 2005-130133 A | 5/2005 |
| JP | 2005-151338 A | 6/2005 |
| JP | 2005-156626 A | 6/2005 |
| JP | 2006-024136 A | 1/2006 |

OTHER PUBLICATIONS
Japanese Office Action (and English translation thereof) dated Feb. 19, 2008, issued in a counterpart Japanese Application.

* cited by examiner

*Primary Examiner* — Amare Mengistu
*Assistant Examiner* — Hong Zhou
(74) *Attorney, Agent, or Firm* — Maschoff Gilmore & Israelsen

(57) ABSTRACT

A control unit displays broadcasting received by a TV tuner unit on a display unit, and executes telop display of displaying character information such as a received electronic mail, etc. together with an image of the broadcasting. If the image display direction is a longitudinal display, a width of a display area of the character information is smaller than that in a case of a lateral display. In other words, in the longitudinal display, the number of characters displayed is smaller than that in the lateral display. For this reason, if the image display direction is the longitudinal display, the control unit makes the moving speed of the displayed characters relatively lower than that in the lateral display.

5 Claims, 6 Drawing Sheets

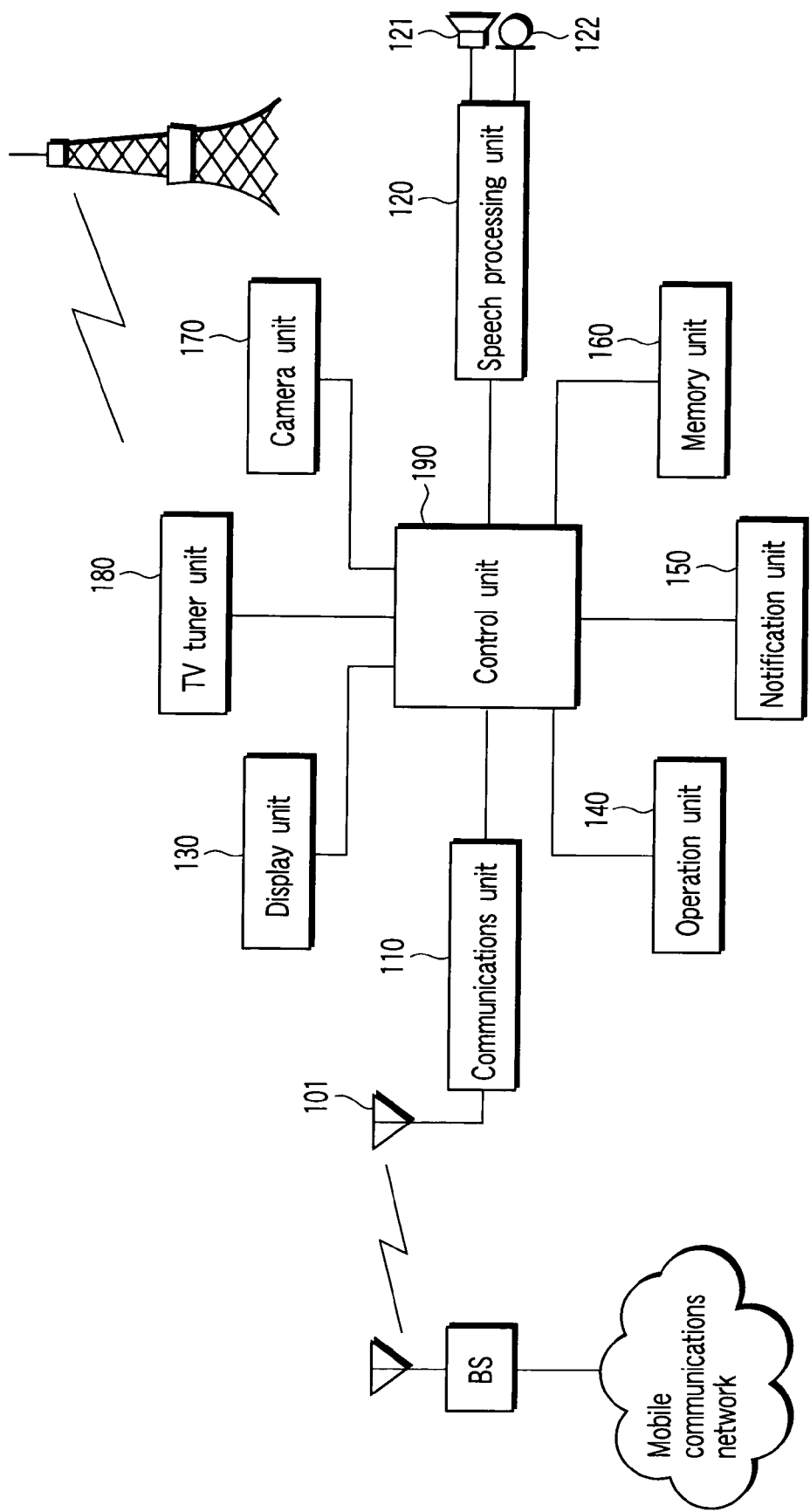
F I G. 1

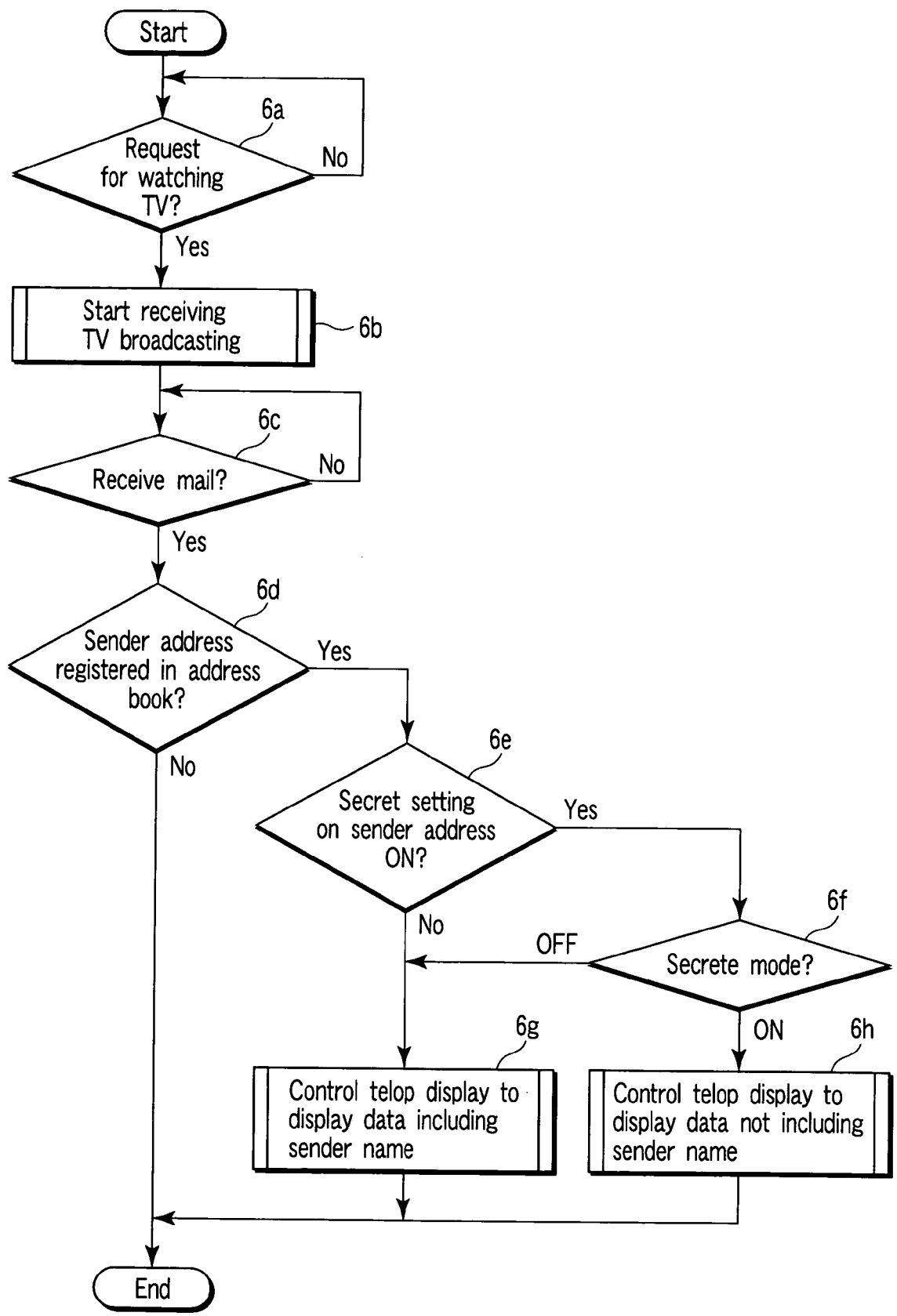
F I G. 6

RADIO COMMUNICATIONS TERMINAL APPARATUS

CROSS-REFERENCE TO RELATED APPLICATIONS

This application is based upon and claims the benefit of priority from prior Japanese Patent Application No. 2006-111200, filed Apr. 13, 2006, the entire contents of which are incorporated herein by reference.

BACKGROUND OF THE INVENTION

1. Field of the Invention

This invention relates to a radio communications terminal apparatus such as a cellular telephone.

2. Description of the Related Art

Recently, a cellular telephone has functioned as a multimedia terminal capable of e-mail transmission and reception, browsing the Web, displaying moving images and still images, reproducing music, receiving television broadcasting, etc. besides speech communication.

If a cellular telephone is thus equipped with a plurality of functions, the plural functions may be executed simultaneously. For example, an electronic mail may be received during the reception of the television broadcasting. In this case, to confirm an electronic mail, it is necessary to stop reception of the television broadcasting, confirm the electronic mail and receive again the television broadcasting. These operations are very troublesome for the user of the cellular telephone.

For this reason, if an electronic mail is received during the reception of the television broadcasting, images of the television broadcasting are displayed together with the contents of the electronic mail (refer to, for example, Jpn. Pat. Appln. KOKAI Publication 2005-151338). Otherwise, telop display of displaying the contents of the electronic mail is executed and the display is automatically scrolled (refer to, for example, Jpn. Pat. Appln. KOKAI Publication 10-269154).

According to the conventional telop display, however, the scroll speed is not appropriate such that the user can hardly recognize the contents of the electronic mail. This problem also occurs in a case of displaying moving images and still images stored in the cellular telephone or displaying character information together with the moving images and still images during browsing the Web.

BRIEF SUMMARY OF THE INVENTION

The present invention has been accomplished to solve the above-described problems. The object of the present invention is to provide a radio communications terminal apparatus which enables the user to easily recognize the character information when telop display of displaying the character information is executed during the display of images.

To achieve this object, an aspect of the present invention is a mobile radio terminal apparatus, making radio communications with a base station apparatus connected to a mobile communications network. The apparatus comprises display means for displaying an image and character information, first display control means for controlling the display means to make the display means display the image, changing means for changing a size of a display area of the image display executed by the first display control means, and second display control means for controlling the display means to make the display means display the character information moved at a speed corresponding to the size of the display area of the image display, together with the image display executed by the first display control means.

According to the present invention, as described above, when the character information is displayed together with images, the character information is moved at a speed responding to the magnitude of the image display area.

Therefore, since the moving speed of the displayed character information is varied in accordance with the image display area during the display of images, the user can easily recognize the character information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 shows a block diagram of a configuration of a radio communications terminal apparatus according to an embodiment of the present invention;

FIG. 6 shows a flowchart of processing for telop display control in the radio communications terminal apparatus shown in FIG. 1.

DETAILED DESCRIPTION OF THE INVENTION

Figure 2A:
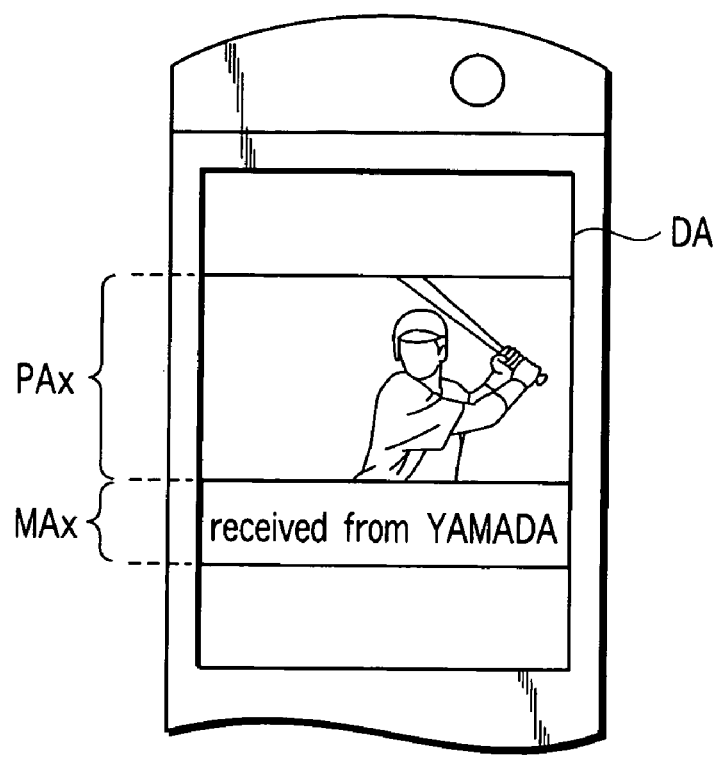
FIG. 2A shows an illustration of an image displayed on a display unit of the radio communications terminal apparatus shown in FIG. 1.

An embodiment of the present invention will be explained below with reference to the accompanying drawings. FIG. 1 shows a configuration of a radio communications terminal apparatus according to an embodiment of the present invention as an example of the radio communications terminal apparatus, a cellular telephone capable of conducting radio communications with a base station BS accommodated in a mobile communications network is described.

The cellular telephone comprises an antenna 101, a communications unit 110, a speech processing unit 120, a display unit 130, an operation unit 140, a notification unit 150, a memory unit 160, a camera unit 170, a TV tuner unit 180, and a control unit 190.

The antenna 101 is employed to receive a radio signal sent from a base station BS and send a radio signal to the base station BS.

The communications unit 110 conducts radio communications with the base station BS via the antenna 101. More specifically, the communications unit 110 downconverts and demodulates the radio signal received by the antenna 101, and obtains encoded speech data and e-mail data sent from a communications partner station. In addition, the communications unit 110 modulates a baseband signal by using encoded speech data and e-mail data supplied from the speech processing unit 120 via the control unit 190, generates a radio signal by upconverting the modulated baseband signal, and sends the radio signal to the base station BS via the antenna 101.

The speech processing unit 120 reproduces a speech signal by decoding the encoded speech data demodulated by the communications unit 110 and outputs the speech signal from a built-in speaker 121. The speech sent from the communications partner station is thereby transmitted to the user. In addition, the speech processing unit 120 generates encoded speech data by encoding a speech signal input from a built-in microphone 122 and supplies the encoded speech data to the communications unit 110 via the control unit 190.

The display unit 130 is a display device employing a LCD (Liquid Crystal Display), etc. and displays various kinds of visual information such as texts, images, etc. to the user under control of the control unit 190.

The operation unit 140 comprises a plurality of key switches to accept user requests. The notification unit 150 notifies the user of reception of incoming calls by sounds.

The memory unit 160 stores control programs and control data of the control unit 190, and address book data associated with telephone numbers, names and image data such as face pictures, etc. and also stores image data such as still images, moving images, etc. e-mail data of previously sent and received electronic mails, parameters relating to the electronic mail display function, etc.

The camera unit 170 is a digital camera employing an image pickup device such as a CCD (Charge-Coupled Device), CMOS (Complementary Metal Oxide Semiconductor), etc. In accordance with instructions of the control unit 190, the camera unit 170 captures still images and moving images and outputs the captured image data to the control unit 190.

The TV tuner unit 180 is a receive circuit which receives the television broadcasting. The TV tuner unit 180 receives a broadcast signal of a channel based on the instructions of the control unit 190, and outputs to the control unit 190 an image signal and a speech signal acquired by the reception of the broadcast signal.

The control unit 190 controls all the units of the cellular telephone. As control functions for conducting speech communications and videophone communications, for example, the control unit 190 comprises an incoming call control function for receiving an incoming call, an outgoing call control function for making an outgoing call in a case where the cellular telephones accepts a request for outgoing call from the user, and a communications control function for establishing a communications link with the communications partner, and sending/receiving the speech data and inputting/outputting the speech at the incoming/outgoing call control time.

In addition, the control unit 190 comprises a television broadcasting reception control function for displaying images based on the image signal acquired by the TV tuner unit 180 on the display unit 130 and outputting the speech signal acquired in the same manner from the speaker 121 via the speech processing unit 120.

Figure 2B:
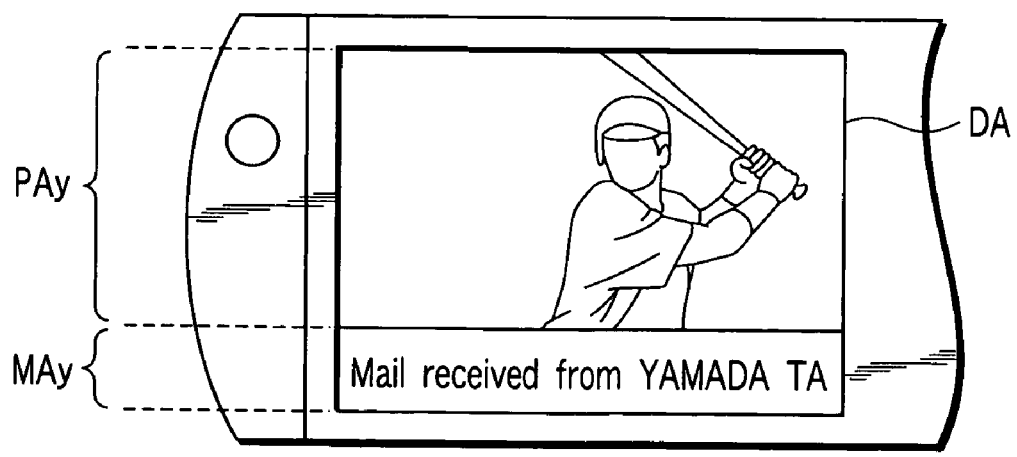
FIG. 2B shows an illustration of an image displayed on a display unit of the radio communications terminal apparatus shown in FIG. 1.

In accordance with a display direction parameter set in the memory unit 160, the control unit 190 executes a longitudinal display for displaying images by setting a short edge of a rectangular display area DA of the display unit 130 as a lateral edge (FIG. 2A), and executes a lateral display for displaying images by setting a long edge of the rectangular display area DA as a lateral edge (FIG. 2B).

The display direction parameter can be varied in accordance with user instructions made via the operation unit 140, and the user can arbitrarily change the display direction if the housing of the mobile radio terminal apparatus is a deformable housing such as a folding-type housing, the control unit 190 may detect the state of the housing and vary the display direction parameter in accordance with the detected state.

Furthermore, control unit 190 comprises a recording control function for recording the image data acquired by the camera unit 170 in the memory unit 160, an image display function for displaying images based on the image data (moving image data and still image data) stored in the memory unit 160 on the display unit 130, an Internet communications control function for controlling the communications unit 110 to connect to the Internet, receiving Web data such as homepages, etc., displaying images based on the Web data on the display unit 130, an e-mail control function for controlling the communications unit 110 to send the e-mail data stored in the memory unit 160, controlling the communications unit 110 to receive an electronic mail and store the received electronic mail in the memory unit 160, and displaying the contents of the electronic mail on the display unit 130.

As a new control function, the control unit 190 further comprises a character information display control function for, when some images of the television broadcasting are displayed on the display unit 130 by the above-described control functions, conducting the telop display of displaying various kinds of character information such as the contents of the electronic mail, together with the displayed images.

Figure 3:
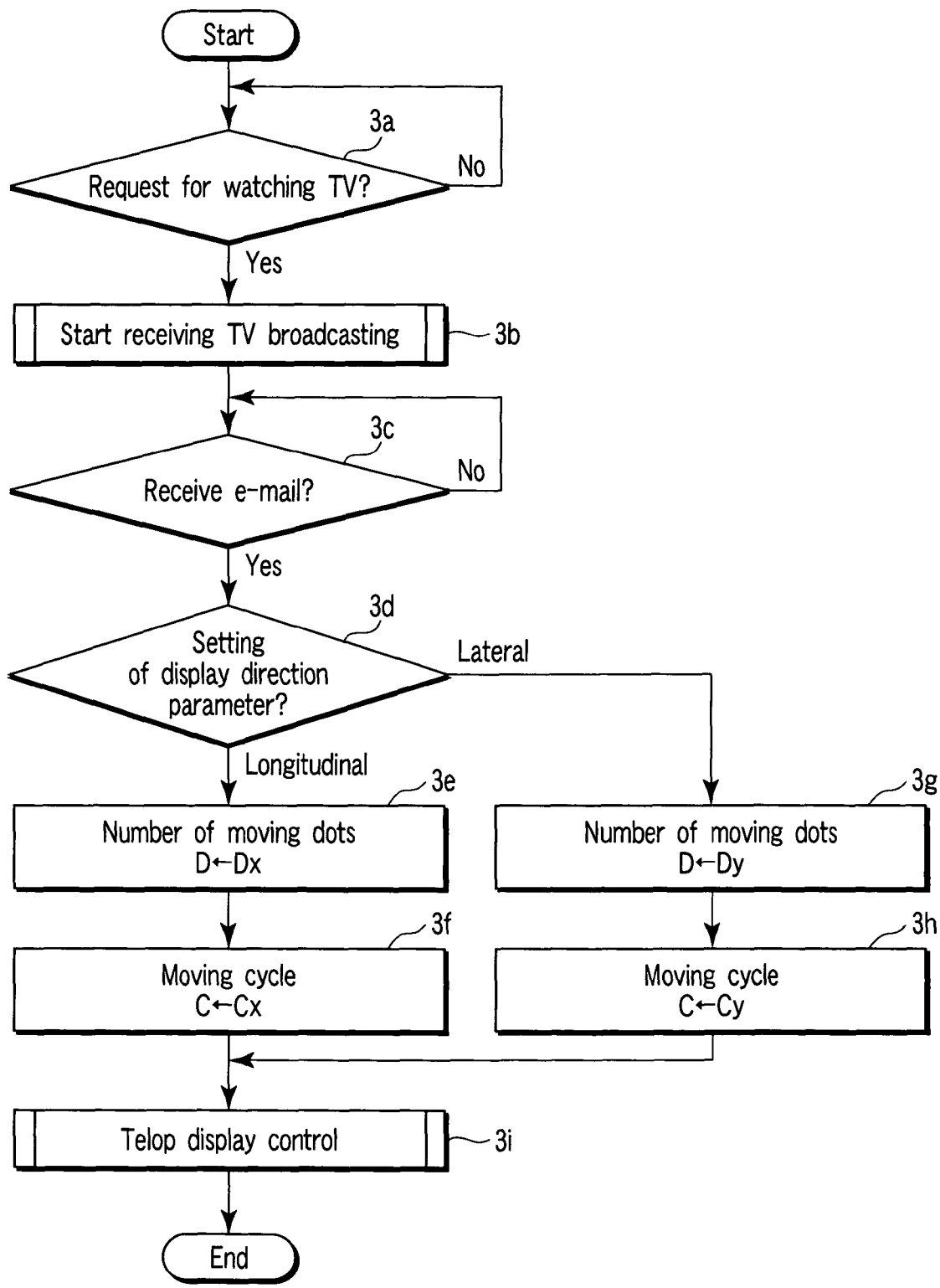
FIG. 3 shows a flowchart of processing for telop display control in the radio communications terminal apparatus shown in FIG. 1.

Next, operations of the radio communications terminal apparatus having the above-described configuration are described. In the following descriptions, the well-known controls of general speech communications, sending/receiving of electronic mails, etc. are omitted, but the character information display control function of the present invention is focused. FIG. 3 is a flowchart showing a control flow of the control unit 190 relating to the character information display control function. If the cellular telephone is turned on, the processing shown in FIG. 3 is repeated until the cellular telephone is turned off.

First, in step 3a, the control unit 190 discriminates whether or not the user operates the operation unit 140 and makes a request for watching TV. If the user makes the request for watching TV, the control unit 190 shifts to step 3b. If the user does not make the request for watching TV, the control unit 190 monitors generation of the request for watching TV.

In step 3b, the control unit 190 controls the TV tuner unit 180 to receive the television broadcasting. The TV tuner unit 180 thereby starts reception of the television broadcasting. An image signal and a speech signal obtained by the reception are output to the control unit 190. The control unit 190 starts processing of outputting the image and speech based on the television broadcasting, and shifts to step 3c.

In other words, the control unit 190 refers to the display direction parameter set in the memory unit 160. If the display direction parameter is set to indicate the longitudinal display, the control unit 190 displays the image based on the image signal, in an image display area PAx of the display area DA of the display unit 130, as shown in FIG. 2A.

If the display direction parameter is set to indicate the lateral display, the control unit 190 displays the image based on the image signal, in an image display area PAy of the display area DA of the display unit 130, as shown in FIG. 2B. In addition, the control unit 190 output the broadcast speech from the speaker 121 via the speech processing unit 120, on the basis of the speech signal, irrespective of the setting of the display direction parameter.

In step 3c, the control unit 190 monitors reception of an electronic mail. In other words, the control unit 190 discriminates whether or not the communications unit 110 has received the e-mail data. If the communications unit 110 has received the e-mail data, the control unit 190 stores the received e-mail data in the memory unit 160, compares the e-mail address of the sender in the e-mail data and the address book data stored in the memory unit 160, detects the name corresponding to the matching address as the name of the sender, and shifts to step 3d. If the communications unit 110 has not received the e-mail data, the control unit 190 monitors the reception of an electronic mail in step 3c.

In step 3d, the control unit 190 discriminates whether the display direction parameter set in the memory unit 160 indicates the setting of the longitudinal display or the setting of the lateral display. If the display direction parameter indicates the setting of the longitudinal display, the control unit 190 shifts to step 3e. If the display direction parameter indicates the setting of the lateral display, the control unit 190 shifts to step 3g.

The control unit 190 sets Dx as number of moving dots D in step 3e and then shifts to step 3f. The control unit 190 sets Cx as moving cycle C in step 3f and then shifts to step 3i.

On the other hand, the control unit 190 sets Dy (>Dx) as the number of moving dots D in step 3g and then shifts to step 3h. The control unit 190 sets Cy as the moving cycle C (<Cx) in step 3h and then shifts to step 3i.

Figure 4:
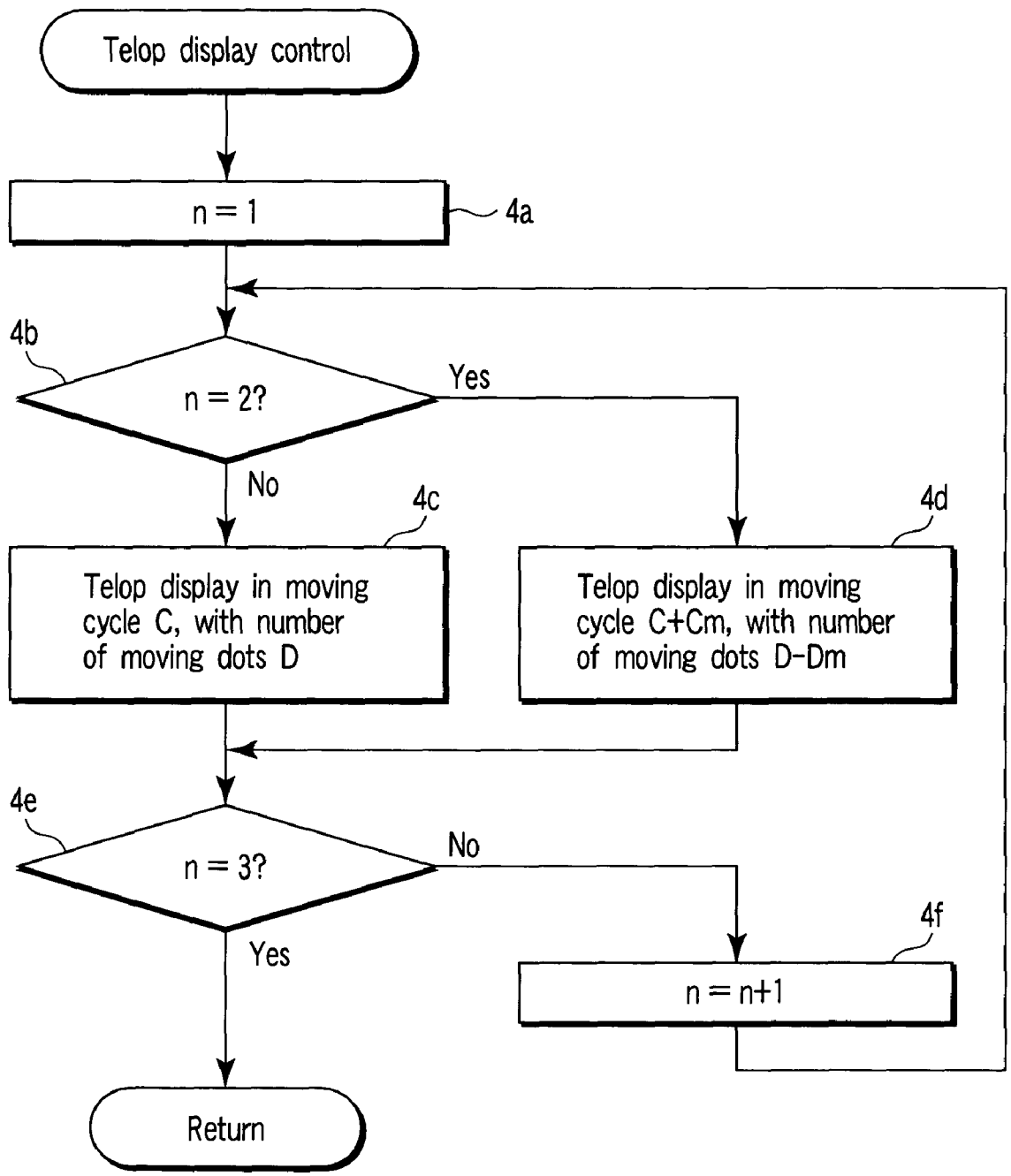
FIG. 4 shows a flowchart of processing for telop display control in the radio communications terminal apparatus shown in FIG. 1.

In step 3i, the control unit 190 controls the telop display of displaying the name of the sender detected in step 3c and the contents of the received e-mail data, together with image display of the television broadcasting, on the basis of the e-mail data received in step 3c. In other words, a sub-routine program for executing telop display control shown in FIG. 4 is executed.

First, the control unit 190 sets "1" as a repeat count parameter n in step 4a, and then shifts to step 4b.

In step 4b, the control unit 190 discriminates whether or not the set value of the repeat count parameter n is "2". If the set value of the repeat count parameter n is "2", the control unit 190 shifts to step 4d. If the set value of the repeat count parameter n is not "2", the control unit 190 shifts to step 4c.

In the step 4c, the control unit 190 reads the e-mail data received in the step 3c from the memory unit 160 and urges the display unit 130 to execute the telop display of displaying the character string of the contents of the e-mail data and the name of the sender detected in the step 3c. In the telop display, the contents of the e-mail data and the name of the sender are displayed to flow from the right side to the left side such that their display is shifted by the number of moving dots D in the moving cycle C.

Figure 5:
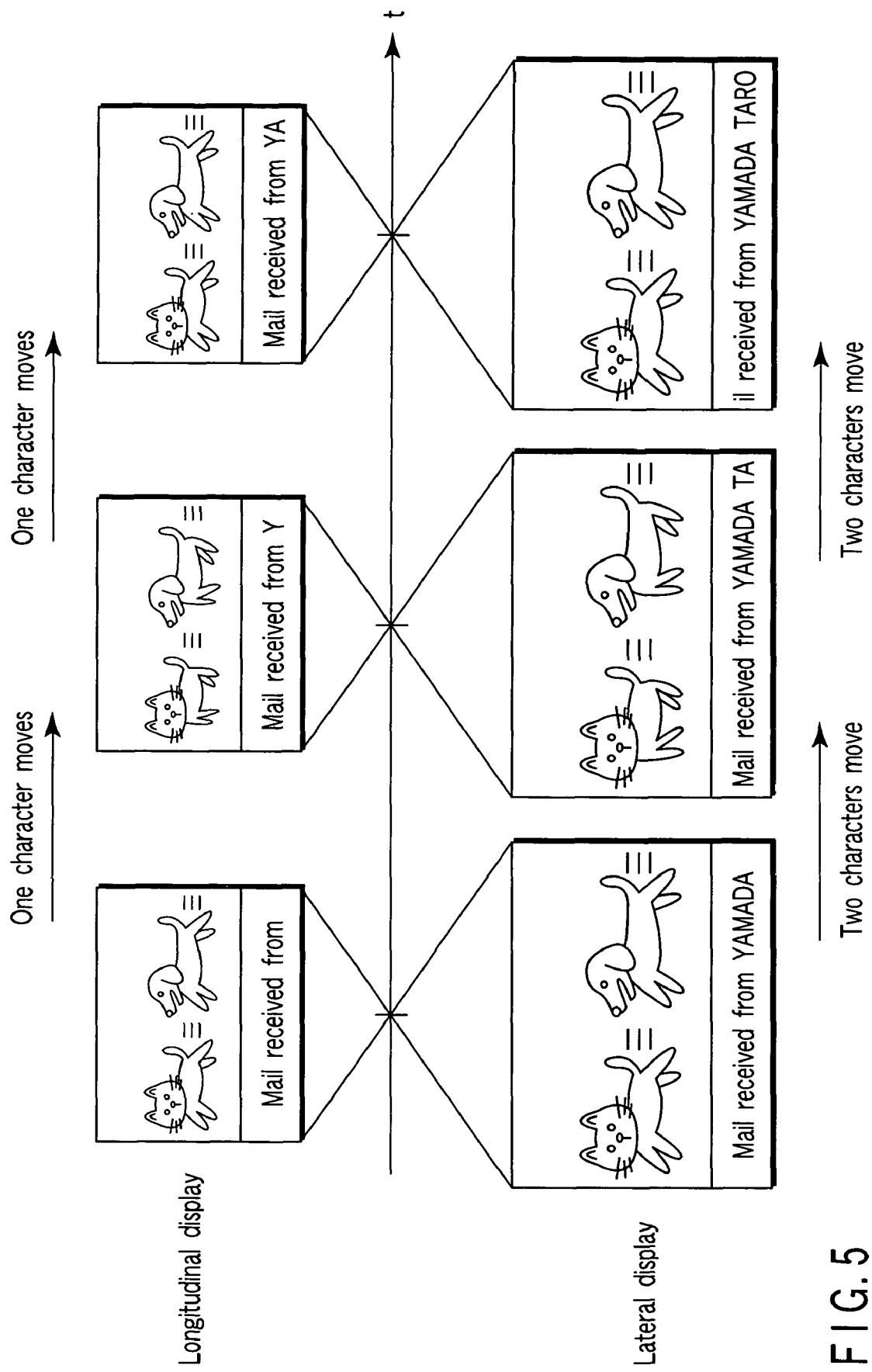
FIG. 5 shows an illustration of change in images displayed on the display unit by the telop display control of the radio communications terminal apparatus shown in FIG. 4.

In other words, if the display direction parameter is set to indicate the longitudinal display, the control unit 190 displays the television broadcasting in the image display area PAx as shown in FIG. 2A, and displays the contents of the e-mail data and the name of the sender in a character information display area MAx adjacent to a long edge of the image display area PAx such that their display is shifted by the number of moving dots Dx in a moving cycle Cx. This state is shown in an upper illustration (above time axis t) of FIG. 5.

On the other hand, if the display direction parameter is set to indicate the lateral display, the control unit 190 displays the television broadcasting in the image display area PAy as shown in FIG. 2B, and displays the contents of the e-mail data and the name of the sender in a character information display area MAy adjacent to a long edge of the image display area PAy such that their display is shifted by the number of moving dots Dy in a moving cycle Cy. This state is shown in a lower illustration (below the time axis t) of FIG. 5.

Therefore, the contents of the e-mail data and the name of the sender are moved relatively quickly in the lateral display, rather than in the longitudinal display. When the contents of the e-mail data and the name of the sender have been displayed by the telop display, the control unit 190 shifts to step 4e.

The character information display areas MAx and MAy are of the same height. However, since the character information display area MAy is wider than the character information display area MAx, a number of character strings can be displayed in the character information display area MAy.

In step 4d, the control unit 190 reads the e-mail data received in step 3c from the memory unit 160, and urges the display unit 130 to execute the telop display of displaying the character string of the contents of the e-mail data and the name of the sender detected in step 3c. In the telop display, the contents of the e-mail data and the name of the sender are displayed to flow from the right side to the left side such that their display is shifted by the number of moving dots D−Dm in the moving cycle C+Cm. Both the values Cm and Dm are preset.

In other words, if the display direction parameter is set to indicate the longitudinal display, the control unit 190 displays the television broadcasting in the image display area PAx as shown in FIG. 2A, and displays the contents of the e-mail data and the name of the sender in a character information display area MAx adjacent to a long edge of the image display area PAx such that their display is shifted by the number of moving dots Dx−Dm in a moving cycle Cx+Cm. This state is shown in an upper illustration (above time axis t) of FIG. 5.

On the other hand, if the display direction parameter is set to indicate the lateral display, the control unit 190 displays the television broadcasting in the image display area PAy as shown in FIG. 2B, and displays the contents of the e-mail data and the name of the sender in a character information display area MAy adjacent to a long edge of the image display area PAy such that their display is shifted by the number of moving dots Dy−Dm in a moving cycle Cy+Cm. This state is shown in a lower illustration (below the time axis t) of FIG. 5.

Therefore, the contents of the e-mail data and the name of the sender are moved relatively quickly in the lateral display, rather than in the longitudinal display. In addition, the contents of the e-mail data and the name of the sender are moved more slowly than the display of step 4c. When the contents of the e-mail data and the name of the sender have been displayed by the telop display in this manner, the control unit 190 shifts to step 4e.

In step 4e, the control unit 190 discriminates whether or not the set value of the repeat count parameter n is "3". If the set value of the repeat count parameter n is "3", the control unit 190 discriminates that the telop display has been executed three times and ends the processing. If the set value of the repeat count parameter n is not "3", the control unit 190 shifts to step 4f.

In step 4f, the control unit 190 adds "1" to the set value of the repeat count parameter n. Then the control unit 190 returns to step 4b.

In the radio communications terminal apparatus having the above-described configuration, the telop display of displaying the character information such as the received electronic mails, etc. is executed together with the broadcast images. If the display direction is the longitudinal direction as shown in FIG. 2A, the width of the display area MAx is smaller than the width of the display area MAy, as compared with a case where the display direction is the lateral direction as shown in FIG. 2B. In other words, the number of characters to be displayed in the longitudinal display is smaller than that in the lateral display. For this reason, the moving speed of the characters to be displayed in the longitudinal display is set to be lower than that in the lateral display.

Therefore, the moving speed of the character information displayed together with the broadcast images can be varied in accordance with the number of characters that can be displayed in the display area. The user can thereby recognize the contents of the character information.

In a case where the telop display is repeated, a second-time telop display is executed comparatively slowly by the processing of step 4d, as compared with a first-time or third-time telop display. Therefore, the most contents can be recognized at the first-time telop display and the contents can be confirmed at the second-time telop display.

In the above-described embodiment, the width of the character information display area is discriminated by discriminating whether the display is the lateral display or the longitudinal display on the basis of the settings of the display direction parameter, but the discrimination of the width of the display area is not limited to this. For example, the shape of the housing is changed in a folding-type cellular telephone (refer to, for example, Jpn. Pat. Appln. KOKAI Publication No. 11-303852, FIG. 3 and FIG. 5).

When the present invention is applied to the cellular telephone, the display direction may be changed in accordance with the shape of the cellular telephone and the width of the character information display area changing in accordance with this may be detected. When the display direction is not changed but the width of the character information display area is changed, the width thereof may be detected and the moving speed of the character information displayed by the telop display may be changed in accordance with the detected width.

In addition, the moving speed of the character information displayed by the telop display is changed by changing the number of moving dots and the moving cycle. However, the moving speed of the character information may be changed by changing either the number of moving dots or the moving cycle.

Moreover, the telop display is repeated automatically three times. However, when the user operates the specific key of the operation unit 140, the telop display may be executed again. In this case, too, for example, the second-time telop display is executed more slowly than the first-time telop display. The user can thereby certainly recognize the contents of the character information displayed by the telop display.

Furthermore, the name of the sender is displayed in accordance with the contents of the e-mail data, in the telop display. However, when secret setting is executed for the address book data corresponding to the name of the sender, e-mail address of the sender may be displayed without displaying the name of the sender. Next, such a telop display control is described below with reference to FIG. 6. FIG. 6 is a flowchart of the telop display control of the control unit 190. If the cellular telephone is turned on, the processing shown in FIG. 6 is repeated until the cellular telephone is turned off.

First, in step 6a, the control unit 190 discriminates whether or not the user has operated the operation unit 140 and made a request for watching TV. If the user has made the request for watching TV, the control unit 190 shifts to step 6b. If the user has not made the request, the control unit 190 continues monitoring the request in step 6a.

In step 6b, the control unit 190 controls the TV tuner unit 180 to receive the television broadcasting. The TV tuner unit 180 thereby starts receiving the television broadcasting. The image signal and speech signal obtained by the reception are output to the control unit 190. The control unit 190 starts the processing of outputting the image and speech on the basis of the television broadcasting, and shifts to step 6c. In other words, the control unit 190 makes the display unit 130 display the image based on the image signal. The control unit 190 also outputs the broadcast speech from the speaker 121 via the speech processing unit 120, on the basis of the speech signal.

In step 6c, the control unit 190 monitors the reception of the electronic mail, i.e. discriminates whether or not the communications unit 110 has received the electronic mail. If the communications unit 110 has received the electronic mail, the control unit 190 stores the received e-mail data in the memory unit 160 and shifts to step 6d. If the communications unit 110 has not received the electronic mail, the control unit 190 continues monitoring the reception of the electronic mail in step 6c.

In step 6d, the control unit 190 compares the e-mail address of the sender sending the e-mail data with the address book data stored in the memory unit 160, and discriminates whether or not an address matching the e-mail address of the sender is included in the address book data. If the matching address is included in the address book data, the control unit 190 shifts to step 6e. If the matching address is not included in the address book data, the control unit 190 ends the processing without displaying the contents of the received e-mail data.

In step 6e, the control unit 190 discriminates whether or not the secret setting is conducted on the e-mail address of the sender, in the address book data. If the secret setting is conducted, the control unit 190 shifts to step 6f. If the secret setting is not conducted, the control unit 190 shifts to step 6g.

In step 6f, the control unit 190 discriminates whether the secrete mode is ON or OFF. If the secrete mode is ON, the control unit 190 shifts to step 6h. If the secrete mode is OFF, the control unit 190 shifts to step 6g.

The ON/OFF state of the secret mode is arbitrarily set by the user via the operation unit 140. The setting information is stored in the memory unit 160. If the secrete mode is ON, the address book data on which the secret setting is conducted cannot be displayed on the display unit 130.

In step 6g, the control unit 190 compares the e-mail address of the sender sending the electronic mail received in step 6c with the address book data stored in the memory unit 160, detects the name corresponding to the matching address as the sender name, controls the telop display of displaying the sender name and the contents of the received e-mail data together with the image display of the television broadcasting, and ends the processing.

In step 6h, the control unit 190 controls the telop display of displaying the e-mail address of the sender sending the electronic mail received in step 6c and the contents of the received e-mail data together with the image display of the television broadcasting, and ends the processing. In the telop display control in step 6h, the moving speed of the displayed character information is set to be higher than that in the telop display control in step 6g.

According to the above-described telop display control, when the secrete mode is ON and the electronic mail is received from the sender at which the secret setting is conducted, the name in the address book data corresponding to the sender is not displayed. For this reason, even if the cellular telephone is left on a desk and the display unit 130 thereof is seen by a third party, the third party cannot recognize the sender sending the electronic mail.

In addition, when the secret mode is ON and the electronic mail is received from the sender at which the secret setting is conducted, the moving speed of the character information displayed the telop display is set to be higher than that in a case where the secret setting is not conducted. For this reason, since the telop display of displaying the electronic mail is executed at a higher speed than that of a general display, the electronic mail cannot easily be peeped by a third party.

In the telop display control shown in FIG. 6, repeating the telop display is not described. However, the telop display may be repeated under control shown in FIG. 4 and the speed of the telop display may be changed in accordance with the number of times of the repetition. If the user operates the specific key of the operation unit 140, the telop display may be executed again. In this case, too, for example, the second-time telop display is executed more slowly than the first-time telop display. The user can thereby certainly recognize the contents of the character information displayed by the telop display.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

For example, the electronic mail is received during the display of the TV broadcast image. However, the electronic mail may be received during the display of the image based on the moving image data and the still image data stored in the memory unit 160, during the display of the streaming data received by the communications unit 110, or during browsing of homepages. The character information displayed together with the data is not limited to the electronic mail but may be character information of the ground-wave digital broadcasting or character information distributed to subscribers from Internet service providers in disaster situations, etc.

The present invention can also be variously modified within a scope which does not depart from the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile radio terminal apparatus which performs radio communications with a base station apparatus connected to a mobile communications network, the mobile radio terminal apparatus comprising:
    a display unit which displays an image in an image display area and displays character information in a character display area;
    a first display control unit configured to execute an image display of the display unit so that the display unit displays the image in the image display area;
    a changing unit configured to change a size of the image display area of the image display executed by the first display control unit, in accordance with a display direction parameter set by user instructions and set a size of the character display area in accordance with the changed size of the image display area of the image display; and
    a second display control unit configured to execute a telop display of the display unit when an electronic mail is received and the image display is executed by the first display control unit, and configured to shift the character information displayed in the character display area by the display unit at a speed that is changeable in accordance with both the display direction parameter and the size of the character display area set by the changing unit.

2. The apparatus according to claim 1, further comprising:
    a broadcast receiving unit configured to receive a broadcasting signal; and
    an electronic mail receiving unit configured to receive an electronic mail;
    wherein the first display control unit executes the image display of the display unit so that the display unit displays an image in the image display area based on the broadcasting signal received by the broadcast receiving unit, and
    wherein if the electronic mail receiving unit receives the electronic mail, the second display control unit executes the telop display of the display unit so that the display unit displays contents of the electronic mail in the character display area.

3. A mobile radio terminal apparatus which performs radio communications with a base station apparatus connected to a mobile communications network, the mobile radio terminal apparatus comprising:
    a display unit that displays an image in an image display area and displays character information in a character display area;
    a first display control unit configured to execute an image display of the display unit when a broadcasting signal is received, so that the display unit displays an image based on the broadcasting signal in the image display area; and
    a second display control unit configured to execute a telop display of the display unit when an electronic mail is received and the image display is executed by the first display control unit so that the display unit repeatedly displays the character information in the character display area, and configured to shift the character information displayed in the character display area at a speed that is changeable in accordance with both a display direction parameter set by user instructions and the number of times the displaying of the character information has been repeated.

4. A mobile radio terminal apparatus which performs radio communications with a base station apparatus connected to a mobile communications network, the mobile radio terminal apparatus comprising:
    an accepting unit configured to accept a request from a user;
    a display unit which displays an image in an image display area and displays character information in a character display area;

a first display control unit configured to execute an image display of the display unit so that the display unit displays the image in the image display area; and a second display control unit configured to execute, if the accepting unit accepts the request, a telop display of the display unit when the request is accepted by the accepting unit and the image display is executed by the first display control unit so that the display unit repeatedly displays the character information in the character display area, the displayed character information being shifted at a speed that is changeable in accordance with both a display direction parameter set by user instructions and the number of times the displaying of the character information has been repeated.

5. A mobile radio terminal apparatus which performs radio communications with a base station apparatus connected to a mobile communications network, the mobile radio terminal apparatus comprising:

an electronic mail receiving unit configured to receive an electronic mail;

a memory unit configured to store address data in which an electronic mail address is associated with setting information representing a secret setting;

a display unit which displays an image in an image display area and displays character information in a character display area;

a first display control unit configured to execute an image display of the display unit so that the display unit displays the image in the image display area;

a changing unit configured to change a size of the image display area of the image display executed by the first display control unit, in accordance with a display direction parameter set by user instructions and set a size of the character display area in accordance with the changed size of the image display area of the image display; and a second display control unit configured to execute, when the electronic mail is received by the electronic mail receiving unit and the image display is executed by the first display control unit, a telop display of the display unit so that the display unit displays contents of the electronic mail in the character display area, the displayed contents of the electronic mail being shifted at a speed that is changeable in accordance with both the display direction parameter and the setting information of the stored address data associated with an electronic mail address of a sender sending the received electronic mail.

* * * * *